United States Patent
Ooms et al.

(10) Patent No.: US 6,852,664 B2
(45) Date of Patent: Feb. 8, 2005

(54) DOUBLE METAL CYANIDE CATALYSTS FOR THE PREPARATION OF POLYETHER POLYOLS

(75) Inventors: Pieter Ooms, Krefeld (DE); Jörg Hofmann, Krefeld (DE); Martin Döbler, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/626,265

(22) Filed: Jul. 23, 2003

(65) Prior Publication Data

US 2004/0092389 A1 May 13, 2004

(30) Foreign Application Priority Data

Aug. 1, 2002 (DE) .......................... 102 35 130

(51) Int. Cl.[7] .......................... B01J 27/26; B01J 31/00; B01J 31/02; B01J 31/06
(52) U.S. Cl. .................. 502/175; 502/156; 502/159; 502/161; 502/162; 502/167; 502/168; 502/170; 502/171; 502/172; 502/155
(58) Field of Search .................. 502/175, 155, 502/156, 159, 161, 162, 167, 168, 170, 171, 172; 423/351, 364, 383, 367, 159

(56) References Cited

U.S. PATENT DOCUMENTS

| | | | |
|---|---|---|---|
| 5,470,813 A | 11/1995 | Le-Khac | 502/175 |
| 5,482,908 A | 1/1996 | Le-Khac | 502/156 |
| 5,536,883 A | 7/1996 | Le-Khac | 568/620 |
| 5,545,601 A | 8/1996 | Le-Khac | 502/156 |
| 5,627,120 A | 5/1997 | Le-Khac | 502/156 |
| 5,637,673 A | 6/1997 | Le-Khac | 528/405 |
| 5,712,216 A | 1/1998 | Le-Khac et al. | 502/175 |
| 5,789,626 A | 8/1998 | Le-Khac | 568/620 |
| 6,018,017 A | 1/2000 | Le-Khac | 528/421 |
| 6,028,230 A * | 2/2000 | Le-Khac et al. | 568/679 |

FOREIGN PATENT DOCUMENTS

| | | |
|---|---|---|
| CA | 2 390 126 | 5/2001 |
| EP | 1 146 062 | 10/2001 |
| JP | 4-145123 | 5/1992 |
| WO | 01/04179 | 1/2001 |

* cited by examiner

*Primary Examiner*—Elizabeth D. Wood
(74) *Attorney, Agent, or Firm*—Joseph C. Gil; John E. Mrozinski, Jr.

(57) ABSTRACT

The present invention relates to novel double metal cyanide (DMC) catalysts for the preparation of polyether polyols by a polyaddition reaction between alkylene oxides and starter compounds having active hydrogen atoms, wherein the catalyst contains a) at least one double metal cyanide compound, b) at least one organic complexing ligand and c) at least one fluorine-containing complexing ligand.

12 Claims, No Drawings

DOUBLE METAL CYANIDE CATALYSTS FOR THE PREPARATION OF POLYETHER POLYOLS

FIELD OF THE INVENTION

The present invention relates to novel double metal cyanide (DMC) catalysts for the preparation of polyether polyols by a polyaddition reaction between alkylene oxides and starter compounds having active hydrogen atoms.

BACKGROUND OF THE INVENTION

Double metal cyanide (DMC) catalysts for polyaddition reactions between alkylene oxides and starter compounds having active hydrogen atoms are known (for example, U.S. Pat. No. 3,404,109, U.S. Pat. No. 3,829,505, U.S. Pat. No. 3,941,849 and U.S. Pat. No. 5,158,922). The utilization of these DMC catalysts for the preparation of polyether polyols in particular brings about a reduction in the proportion of monofunctional polyethers having terminal double bonds, so-called monools, by comparison with the conventional preparation of polyether polyols by means of alkali catalysts, such as alkali metal hydroxides. The polyether polyols thus obtained can be processed to form high-grade polyurethanes (for example elastomers, foams, coatings). DMC catalysts are normally obtained by reacting an aqueous solution of a metal salt with the aqueous solution of a metal cyanide salt in the presence of an organic complexing ligand, for example an ether. In a typical catalyst preparation, for example, aqueous solutions of zinc chloride (in excess) and potassium hexacyanocobaltate are mixed, and dimethoxyethane (glyme) is then added to the suspension formed. Following filtration and washing of the catalyst with aqueous glyme solution an active catalyst corresponding to the general formula

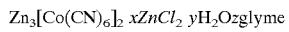

Zn$_3$[Co(CN)$_6$]$_2$·xZnCl$_2$·yH$_2$O·zglyme is obtained (see, for example, EP-A 700 949).

JP-A 4 145 123, U.S. Pat. No. 5,470,813, EP-A 700 949, EP-A 743 093, EP-A 761 708 and WO 97/40086 disclose DMC catalysts which further reduce the proportion of monofunctional polyethers having terminal double bonds when polyether polyols are prepared, by the utilization of tert.-butanol as an organic complexing ligand (alone or in combination with a polyether (EP-A 700 949, EP-A 761 708, WO 97/40086)). Moreover, the utilization of these DMC catalysts reduces the induction time in the polyaddition reaction of the alkylene oxides with corresponding starter compounds and increases catalytic activity.

SUMMARY OF THE INVENTION

It has now been found that DMC catalysts having one or more fluorine-containing complex-forming components can be utilized advantageously in the polyether polyol preparation. In particular they are also suitable for the polymerization of ethylene oxide or the copolymerization of ethylene oxide and higher epoxides such as propylene oxide.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, functionalities and so forth in the specification are to be understood as being modified in all instances by the term "about."

The present invention provides a double metal cyanide (DMC) catalyst comprising
a) at least one double metal cyanide compound,
b) at least one organic complexing ligand lacking fluorine atoms, and
c) at least one fluorine-containing complexing ligand.

The catalyst according to the present invention may optionally also have d) water, in an amount preferably from 1 to 10 wt. %, and/or e) one or more water-soluble metal salts, preferably in an amount from 5 to 25 wt. %, from the preparation of the double metal cyanide compounds a). These preferably correspond to the formula M(X)$_n$, wherein M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Zn(II), Fe(II), Co(II) and Ni(II) are more preferred. X are anions which may be the same or different, preferably the same. X is preferably selected from the group consisting of the halides, hydroxides, sulfates, carbonates, cyanates, thiocyanates, isocyanates, isothiocyanates, carboxylates, oxalates or nitrates. The value of n is preferably 1, 2 or 3.

The double metal cyanide compounds a) in the catalysts according to the present invention may be obtained by the reaction of water-soluble metal salts and water-soluble metal cyanide salts.

Water-soluble metal salts which are suitable for the preparation of double metal cyanide compounds of the present invention a) preferably have the formula (I)

$$M(X)_n, \quad (I)$$

wherein M is selected from among the metals Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III), Zn(II), Fe(II), Co(II) and Ni(II) are more preferred. The anions X are the same or different, preferably the same, and are preferably selected from the group consisting of the halides, hydroxides, sulfates, carbonates, cyanates, thiocyanates, isocyanates, isothiocyanates, carboxylates, oxalates or nitrates. The value of n is preferably 1, 2 or 3.

Examples of suitable water-soluble metal salts include, but are not limited to, zinc chloride, zinc bromide, zinc acetate, zinc acetyl acetonate, zinc benzoate, zinc nitrate, iron(II) sulfate, iron(II) bromide, iron(II) chloride, cobalt(II) chloride, cobalt(II) thiocyanate, nickel(II) chloride and nickel(II) nitrate. Mixtures of different water-soluble metal salts may also be utilized.

Water-soluble metal cyanide salts which are suitable for the preparation of double metal cyanide compounds a) preferably have the formula (II),

$$(Y)_a M'(CN)_b (A)_c, \quad (II)$$

wherein M' is selected from among the metals Fe(II), Fe(III), Co(II), Co(III), Cr(II), Cr(III), Mn(II), Mn(III), Ir(III), Ni(II), Rh(III), Ru(II), V(IV) and V(V). M' is more preferably selected from among the metals Co(II), Co(III), Fe(II), Fe(III), Cr(III), Ir(III) and Ni(II). The water-soluble metal cyanide salt may include one or more of these metals. The cations Y are the same or different, preferably the same, and are selected from the group which includes the alkali metal ions and alkaline earth metal ions. The anions A are the same or different, preferably the same, and are selected from the halides, hydroxides, sulfates, carbonates, cyanates, thiocyanates, isocyanates, isothiocyanates, carboxylates, oxalates or nitrates group. Both a and also b and c are integers, wherein the values of a, b and c are selected such that the metal cyanide salt is electrically neutral; a is preferably 1, 2, 3 or 4; b is preferably 4, 5 or 6; c preferably has the value 0. Examples of suitable water-soluble metal cyanide salts include, but are not limited to, potassium hexacyanocobaltate(III), potassium hexacyanoferrate(II), potassium hexacyano-ferrate(III), calcium hexacyanocobaltate(III) and lithium hexacyanocobaltate (III).

Preferred double metal cyanide compounds a) in the catalysts according to the present invention are compounds corresponding to the formula (III)

wherein M is defined as in the formula (I), and
M' is defined as in the formula (II), and
x, x', y and z are integers and are selected such that the double metal cyanide compound is electrically neutral.
Preferably
X=3, x'=1, y=6, and z=2,
M=Zn(II), Fe(II), Co(II) or Ni(II), and
M'=Co(III), Fe(III), Cr(III) or Ir(III).

Examples of suitable double metal cyanide compounds a) include, but are not limited to, zinc hexacyanocobaltate(III), zinc hexacyanoiridate(III), zinc hexacyanoferrate(III) and cobalt(II) hexacyanocobaltate(III). Further examples of suitable double metal cyanide compounds may be found in, for example, U.S. Pat. No. 5,158,922. Zinc hexacyanocobaltate (III) is most preferably used.

The organic complexing ligands b) in the DMC catalysts according to the present invention are known in principle and are described in detail in the art (for example in U.S. Pat. No. 5,158,922, U.S. Pat. No. 3,404,109, U.S. Pat. No. 3,829,505, U.S. Pat. No. 3,941,849, EP-A 700 949, EP-A 761 708, JP-A 4 145 123, U.S. Pat. No. 5,470,813, EP-A 743 093 and WO 97/40086). Preferred organic complexing ligands include, but are not limited to, water-soluble organic compounds having heteroatoms such as oxygen, nitrogen, phosphorus or sulfur, which can form complexes with the double metal cyanide compound a). Suitable organic complexing ligands are, for example, alcohols, aldehydes, ketones, ethers, esters, amides, ureas, nitriles, sulfides and mixtures thereof. Preferred organic complexing ligands are water-soluble aliphatic alcohols such as ethanol, isopropanol, n-butanol, iso-butanol, sec.-butanol and tert.-butanol. tert.-Butanol is more preferred.

The catalysts according to the present invention have at least one fluorine-containing complexing ligand c) which may preferably be fluorine-containing monomeric compounds or fluorine-containing functionalized polymers, more preferably polymers having no ionic groups.

Examples of suitable monomeric fluorine-containing complexing ligands include, but are not limited to, fluorinated alcohols, ethers, aldehydes, ketones, acetals, carboxylic acid esters, carboxylic acid amides, carboxylic acid nitriles and phosphorus compounds.

Fluorine-containing alcohols suitable for the preparation of the catalysts according to the present invention include, but are not limited to, monohydric or polyhydric, acyclic or cyclic, aliphatic or aromatic alcohols having 1 to 30 Carbon atoms. Examples are 2,2,2-trifluoroethanol, 1,3-difluoro-2-propanol, 2,2,3,3-tetrafluoro-1-propanol, 2,2,3,3,3-pentafluoro-1-propanol, 1,1,1,3,3,3-hexafluoro-2-propanol, perfluoro-tert.-butanol, 2,2,3,4,4,4-hexafluoro-1-butanol, 2,2,3,3,4,4,4-heptafluoro-1-butanol, 1,1,1,3,3,4,4,4-octafluoro-2-butanol, 2,2,3,3,4,4,5,5-octafluoro-1-pentanol, 2-fluorocyclohexanol, 3,3,4,4,5,5,6,6,7,7,8,8,8-tridecafluoro-1-octanol, 2,2,3,3,4,4,5,5,6,6,7,7,8,8,8-pentadecafluoro-1-octanol, 2-fluoroethoxyethanol, 1-fluoroethylene glycol, 3-fluoro-1,2-propanediol, 2,3-difluoro-1,4-butanediol, 2,2,3,3,4,4-hexafluoro-1,5-pentanediol, 2,2,3,3,4,4,5,5-octafluorol, 6-hexanediol, 2,2,3, 3,4,4,5,5,6,6,7,7,8,8,9,9-hexadecafluoro-1,10-decanediol, 2-fluoro-1,2,3-propanetriol, 2-fluoromethyl-2-hydroxymethyl-1,3-propanediol, 2-fluoroethyl-2-hydroxymethyl-1,3-propanediol, 2,2,3,3,4,4,5,5-octafluorohexane-1,6-diol, 1,1,1,5,5,5-hexafluoro-pentanetriol, 4-fluorophenol and 4-trifluoromethylphenol. 2,2,3,3,4,4,5,5-octafluorohexane-1,6-diol and 2-fluoroethoxyethanol are preferred.

Fluorine-containing ethers which are suitable for the preparation of the catalysts according to the present invention include, but are not limited to, saturated or unsaturated, straight-chain or branched, acyclic or cyclic, aliphatic or aromatic dialkyl, alkylaryl or diaryl ethers having 1 to 30 Carbon atoms, such as, for example, bis(2,2,2-trifluoroethyl) ether, allyl-1,1,2,2-tetrafluoroethyl ether, allyl-1,1,2,3,3,3-hexafluoropropyl ether, epifluorohydrin, hexafluoropropylene oxide, 2,3-epoxypropyl-1,1,2,2-tetrafluoroethyl ether, 2,3-epoxypropyl-2,2,3,3-tetrafluoropropyl ether, 2,3-epoxypropyl-2,2,3,3,4,4,5,5-octafluoropentyl ether, 2,3-epoxypropyl-2,2,3,3,4,4,5,5,6,6,7,7,8,8,9,9-hexadecafluorononyl ether, ethylene glycol mono-4,4,5,5,5-pentafluoropentyl ether and tetraethylene glycol pentafluoroethyl ether, 2,2-bis(trifluoromethyl)-1,3-dioxolane, trifluoromethoxy benzene, 1-methyl-2-(1,1,2,2-tetrafluoroethoxy)benzene, 2-fluoroanisole, 3-fluoroanisole, 3-(trifluoromethyl)anisole, 4-(trifluoromethoxy)toluene, 1-bromo-4-(trifluoromethoxy)benzene, 2,4-difluoroanisole, 2,3,5,6-tetrafluoroanisole and 2,3,4,5,6-pentafluoroanisole. Ethylene glycol mono-4,4,5,5,5-pentafluoropentyl ether and tetraethylene glycol pentafluoroethyl ether are preferred.

Fluorine-containing aldehydes and ketones which are suitable for the preparation of the catalysts according to the present invention include, but are not limited to, saturated or unsaturated, straight-chain or branched, acyclic or cyclic, aliphatic or aromatic aldehydes and ketones having 1 to 30 Carbon atoms, such as, for example, trifluoroacetaldehyde, fluoroacetone, 1,1,1-trifluoroacetone, hexafluoroacetone, perfluoro-2-butanone, perfluorocyclopentanone, 1,1,1-trifluoro-2,4-pentanedione and 1,1,1,5,5,5-hexafluoro-2,4-pentanedione.

Fluorine-containing acetals which are suitable for the preparation of the catalysts according to the present invention include, but are not limited to, saturated or unsaturated, straight-chain or branched, acyclic or cyclic, aliphatic or aromatic acetals having 1 to 30 Carbon atoms, wherein fluorine may be in the carbonyl component and/or in the alcohol component, such as, for example, trifluoroacetaldehyde ethyl hemiacetal, trifluoroacetaldehyde dimethyl acetal and hexafluoroacetone dimethyl acetal.

Fluorine-containing carboxylic acid esters which are suitable for the preparation of the catalysts according to the present invention include, but are not limited to, saturated or unsaturated, straight-chain or branched, acyclic or cyclic, aliphatic or aromatic monoesters, diesters, triesters or polyesters of monovalent or polyvalent carboxylic acids having 1 to 30 Carbon atoms and monohydric or polyhydric alcohols having 1 to 30 Carbon atoms, wherein fluorine may be in the carboxylic acid component and/or in the alcohol component, such as, for example, methyl difluoroacetate, ethyl difluoroacetate, methyl trifluoroacetate, ethyl fluoroacetate, ethyl trifluoroacetate, isopropyl trifluoroacetate, butyl trifluoroacetate, 2,2,2-trifluoroethyl trifluoroacetate, methyl pentafluoropropionate, ethyl pentafluoropropionate, 2,2,2-trifluoroethyl butyrate, methyl heptafluorobutyrate, ethyl heptafluorobutyrate, methyl pentadecafluorooctanate, methyl nonadecafluorodecanate, diethyl fluoromalonate, bis(2,2,3,3,4,4,5,5,6,6,7,7-dodecafluoroheptyl) camphorate, glycerol triperfluorooctanate, glycerol perfluorododecanate, 1-(trifluoromethyl)ethenyl acetate, 2,2,2-trifluoroethyl acrylate, 2,2,3,3-tetrafluoropropyl acrylate, 1,1,1,3,3,3-hexafluoroisopropyl acrylate, 2,2,2-trifluoroethyl methacrylate, 2,2,3,3-tetrafluoropropyl methacrylate, 1,1,1,3,3,3-hexafluoroisopropyl methacrylate, 2,2,3,4,4,4-hexafluorobutyl methacrylate, ethyl-4,4,4-trifluorocrotonate, vinyl trifluoroacetate, allyl trifluoroacetate, ethyl-4,4,4-trifluoro-3-hydroxybutyrate and sorbitan trifluoroacetate. Glycerol triperfluorooctanate, glycerol perfluorododecanate and 2,2,3,4,4,4-hexafluorobutyl methacrylate are preferred.

Optionally fluorine-substituted polyalkylene glycols or polyalkylene glycol ethers, preferably polypropylene glycols, polyethylene glycols, poly(oxypropylene-oxyethylene) polyols and poly(tetramethylene) glycols or ethers thereof having molecular weights of 200 to 10,000 g/mol, preferably 300 to 9,000 g/mol, particularly preferably 400 to 8,000 g/mol, are also suitable as the alcohol component.

Fluorine-containing carboxylic acid amides which are suitable for the preparation of the catalysts according to the present invention include, but are not limited to, saturated or unsaturated, straight-chain or branched, acyclic or cyclic, aliphatic or aromatic amides of monovalent or polyvalent carboxylic acids and monovalent or polyvalent amines, wherein fluorine may be in the carboxylic acid component and/or in the amine component, such as 2,-fluoroacetamide, 2,2,2-trifluoroacetamide, 2-chloro-2,2-difluoroacetamide, N-methyl-2,2,2-trifluoroacetamide, N-methyl-bis (trifluoroacetamide), N-(2-hydroxyethyl)-2,2,2-trifluoroacetamide, N,N-diethyl-2,2,2-trifluoroacetamide, N-cyclopentyl-2,2,2-trifluoroacetamide, trifluoromethyl carbamate, 1-methyl-2,2,3,3-tetrafluoropropyl carbamate, 3-trifluoromethyl-2-oxazolidinone, 1-trifluoromethyl pyrrolidinone, 1-pentafluoroethyl pyrrolidinone and 1-trifluoromethyl caprolactam.

Fluorine-containing carboxylic acid nitriles which are suitable for the preparation of the catalysts according to the present invention include, but are not limited to, saturated or unsaturated, straight-chain or branched, acyclic or cyclic, aliphatic or aromatic nitriles having 1 to 30 Carbon atoms, such as fluoroacetonitrile, pentafluoropropionitrile, heptafluorobutyronitrile and 2,2,3,3-tetrafluorocyclobutane carboxylic acid nitrile.

Fluorine-containing phosphorus compounds which are suitable for the preparation of the catalysts according to the present invention include, but are not limited to, fluorine-containing organic phosphates, phosphites, phosphonates, phosphonites, phosphinates and phosphinites.

Suitable organic phosphates include, but are not limited to, monoesters, diesters or triesters of phosphoric acid, monoesters, diesters, triesters or tetraesters of pyrophosphoric acid and monoesters, diesters, triesters, tetraesters or polyesters of polyphosphoric acid and fluorine-substituted alcohols having 1 to 30 Carbon atoms, such as, for example, diisopropyl fluorophosphate and tris(1-fluorobutyl) phosphate.

Suitable organic phosphites include, but are not limited to, fluorine-containing monoesters, diesters or triesters of phosphorous acid and fluorine-substituted alcohols having 1 to 30 Carbon atoms, such as, for example, tris(2,2,2-trifluoroethyl) phosphite, tris(1,1,1,3,3,3-hexafluoro-2-propyl) phosphite and bis(2,2,2-trifluoroethyl) phosphite.

Organic phosphonates which are suitable as the fluorine-containing complexing ligand c) include, but are not limited to, fluorine-containing monoesters or diesters of phosphonic acid, alkylphosphonic acids, arylphosphonic acids, fluoroalkylphosphonic acids, fluoroarylphosphonic acids, alkoxycarbonylalkylphosphonic acids, alkoxycarbonylphosphonic acids, alkoxycarbonylfluoroalkylphosphonic acids, fluoroalkoxycarbonylfluoroalkylphosphonic acids, fluoroalkoxycarbonylphosphonic acids, cyanoalkylphosphonic acids, cyanofluoroalkylphosphonic acids and cyanophosphonic acids or monoesters, diesters, triesters or tetraesters of alkyldiphosphonic acids and fluoroalkyldiphosphonic acids, and fluorine-substituted alcohols having 1 to 30 Carbon atoms, such as, for example, diethyl(difluoromethyl) phosphonate, diethyl(trifluoromethyl) phosphonate, bis(2,2,2-trifluoroethyl) methylphosphonate, (triethyl-2-fluoro-2-phosphonoacetate, bis(2,2,2-trifluoroethyl) (methoxycarbonylmethyl) phosphonate and diethyl(2,2,2-trifluoro-1-hydroxyethyl) phosphonate.

Fluorine-containing diesters of phosphonous acid, alkyl phosphonous acid, fluoroalkylphosphonous acid, arylphosphonous acid or fluoroarylphosphonous acid and fluorine-substituted alcohols having 1 to 30 Carbon atoms are also suitable as the fluorine-containing complexing ligand c).

Phosphinates which are suitable as the fluorine-containing complexing ligand c) include, but are not limited to, fluorine-containing esters of phosphinic acid, alkylphosphinic acids, fluoroalkylphosphinic acids, dialkylphosphinic acids, difluoroalkylphosphinic acids, arylphosphinic acids or fluoroarylphosphinic acids, and fluorine-substituted alcohols having 1 to 30 Carbon atoms.

Phosphinites which are suitable as the fluorine-containing complexing ligand c) include, but are not limited to, fluorine-containing esters of alkylphosphinous acid, fluoroalkylphosphinous acid, dialkylphosphinous acid, difluoroalkylphosphinous acid, arylphosphinous acid or fluoroarylphosphinous acid and fluorine-substituted alcohols having 1 to 30 Carbon atoms.

Partially fluorinated or perfluorinated monohydric or polyhydric aryl, aralkyl, alkoxyalkyl and alkyl alcohols having 1 to 30 Carbon atoms, preferably 1 to 24 Carbon atoms, more preferably 1 to 20 Carbon atoms, preferably aralkyl, alkoxyalkyl and alkyl alcohols, more preferably alkoxyalkyl and alkyl alcohols, are suitable as the alcohol component.

The fluorine-containing organic phosphates, phosphites, phosphonates, phosphonites, phosphinates or phosphinites utilized for the preparation of the catalysts according to the present invention are generally obtained by reacting phosphoric acid, pyrophosphoric acid, polyphosphoric acids, phosphonic acid, alkylphosphonic acids, arylphosphonic acids, alkoxycarbonylalkylphosphonic acids, alkoxycarbonylphosphonic acids, cyanoalkylphosphonic acids, fluoroalkylphosphonic acids, fluoroarylphosphonic acids, fluoroalkoxycarbonylalkylphosphonic acids, fluoroalkoxycarbonylphosphonic acids, cyanofluoroalkylphosphonic acids, cyanophosphonic acid, alkyldiphosphonic acids, phosphonous acid, phosphorous acid, phosphinic acid, phosphinous acid or halo derivatives thereof or phosphorus oxides having partially fluorinated or perfluorinated hydroxy compounds having 1 to 30 Carbon atoms, for example fluorine derivatives of methanol, ethanol, propanol, butanol, pentanol, hexanol, 2-ethylhexanol, heptanol, octanol, nonanol, decanol, dodecanol, tridecanol, tetradecanol, pentadecanol, hexadecanol, heptadecanol, octadecanol, nonadecanol, methoxymethanol, ethoxymethanol, propoxymethanol, butoxymethanol, 2-ethoxyethanol, 2-propoxyethanol, 2-butoxyethanol, phenol, hydroxyethanoic acid ethyl ester, hydroxyethanoic acid propyl ester, hydroxypropionic acid ethyl ester, hydroxypropionic acid propyl ester, 1,2-ethanediol, 1,2-propanediol, 1,2,3-trihydroxypropane, 1,1,1-trimethylolpropane or pentaerythritol.

Examples of suitable fluorine-containing functionalized polymers include, but are not limited to, fluorinated derivatives of polyethers, polyesters, polycarbonates, polyalkylene glycol sorbitan esters, polyalkylene glycol glycidyl ethers, polyacrylamides, poly(acrylamide co-acrylic acids), polyacrylic acids, poly(acrylic acid co-maleic acids), polyacrylonitriles, polyalkyl acrylates, polyalkyl methacrylates, polyvinyl methyl ethers, polyvinyl ethyl ethers, polyvinyl acetates, polyvinyl alcohols, poly-N-vinyl pyrrolidones, poly(N-vinylpyrrolidone co-acrylic acids), polyvinyl methyl ketones, poly(4-vinyl phenols), poly (acrylic acid co-styrenes), oxazoline polymers, polyalkylene imines, maleic acid copolymers or maleic anhydride copolymers, hydroxyethyl celluloses or polyacetals.

Fluorine-containing functionalized polymers which are preferably utilized include, but are not limited to, partially or fully fluorinated polyethers, polyesters, polycarbonates, polyalkylene glycol sorbitan esters and polyalkylene glycol glycidyl ethers. Partially or fully fluorinated polyethers are more preferably utilized.

Fluorine-containing polyether derivatives which are suitable for the preparation of the catalysts according to the present invention include, but are not limited to, fluorine-containing polyether polyols having hydroxy functionalities of from 1 to 8, particularly preferably 1 to 3, and number average molecular weights of 150 to $10^7$ g/mol, particularly preferably 200 to $5 \cdot 10^4$ g/mol and alkyl, aralkyl, aryl, fluoroalkyl, fluoroaralkyl or fluoroaryl ethers thereof. They are generally obtained by a ring-opening polymerization of epoxides in the presence of corresponding starter compounds having active hydrogen atoms, with basic, acid or coordination catalysis (for example DMC catalysis). Suitable polyether polyols include, but are not limited to, poly(oxyperfluoropropylene) polyols, poly(oxyperfluoroethylene) polyols, EO-tipped poly(oxyperfluoropropylene) polyols, mixed poly(oxyperfluoroethylene-oxyperfluoropropylene) polyols, mixed perfluoropropylene-perfluoroformaldehyde polyols, fluorobutylene oxide polymers, fluorobutylene oxide copolymers with ethylene oxide and/or propylene oxide, and poly(oxyperfluorotetramethylene)glycols as well as poly(oxypropylene)fluoroalkyl ethers, poly(oxypropylene) fluoroaryl ethers, poly(oxyethylene)fluoroalkyl ethers, poly(oxyethylene)fluoroaryl ethers, poly(oxyperfluoropropylene)alkyl ethers, poly(oxyperfluoropropylene) fluoroalkyl ethers, poly(oxyperfluoroethylene)alkyl ethers, poly(oxyperfluoroethylene)fluoroalkyl ethers, poly(oxyperfluoroethylene)aryl ethers and poly(oxyperfluoropropylene)-perfluoroformaldehyde copolymers.

The DMC catalysts according to the present invention contain the double metal cyanide compounds a) in quantities of from 20 to 90 wt. %, preferably 25 to 80 wt. %, in relation to the quantity of finished catalyst, and the organic complexing ligands b) in quantities of from 0.5 to 30 wt. %, preferably 1 to 25 wt. %, in relation to the quantity of finished catalyst. The DMC catalysts according to the invention contain from 1 to 80 wt. %, preferably 1 to 40 wt. %, in relation to the quantity of finished catalyst, of at least one fluorine-containing complexing ligand c). The double metal cyanide compounds and the organic complexing ligands b) may be present in the DMC catalysts of the present invention in an amount ranging between any combination of these values respectively, inclusive of the recited values.

Analysis of the catalyst composition may be performed by means of elemental analysis, thermogravimetry or extractive removal of the complexing ligands followed by gravimetric determination.

The catalysts according to the invention may be crystalline, partially crystalline or amorphous. Analysis of crystallinity may preferably be by powder X-ray diffractometry.

Catalysts according to the present invention comprising
a) zinc hexacyanocobaltate(III),
b) tert.-butanol and
c) at least one fluorine-containing complexing ligand are preferred.

The DMC catalysts according to the invention may preferably be prepared in aqueous solution by reaction of metal salts, in particular corresponding to the formula (I), with metal cyanide salts, in particular corresponding to the formula (II), in the presence of organic complexing ligands b) which lack fluorine atoms, and one or more fluorine-containing complexing ligands c).

The aqueous solutions of the metal salt (for example zinc chloride, utilized in stoichiometric excess (at least 50 mol. % in relation to the metal cyanide salt)) and of the metal cyanide salt (for example potassium hexacyanocobaltate) may preferably be reacted first in the presence of the organic complexing ligand b) (for example tert.-butanol) and the fluorine-containing complexing ligand(s) c), wherein a suspension forms which includes the double metal cyanide compound a) (for example zinc hexacyanocobaltate), water d), excess metal salt e) and the organic complexing ligand b) and the fluorine-containing complexing ligand(s) c).

The organic complexing ligand b) and/or the fluorine-containing complexing ligand(s) c) may preferably be present in the aqueous solution of the metal salt and/or of the metal cyanide salt, or may be added directly to the suspension obtained following precipitation of the double metal cyanide compound a). It has proved to be advantageous to mix the aqueous solutions and the organic complexing ligand b) and the fluorine-containing complexing ligand(s) c) with vigorous stirring.

The catalyst may be isolated from the suspension by known techniques such as centrifuging or filtration. In a preferred embodiment, the isolated catalyst may subsequently be washed with an aqueous solution of the organic complexing ligand b) (for example by re-suspension followed by re-isolation by filtration or centrifuging). Water-soluble by-products such as potassium chloride can, for example, be removed in this way from the catalyst according to the present invention.

The quantity of the organic complexing ligand b) in the aqueous washing solution is preferably between 40 and 80 wt. %, in relation to the total solution. It is additionally advantageous to add to the aqueous washing solution a small quantity of the mixture of one or more fluorine-containing complexing ligands c), preferably from 0.5 to 5 wt. %, in relation to the total solution It is furthermore advantageous to wash the catalyst more than once. The first washing operation may, for example, be repeated for this purpose. It is, however, preferred, to use non-aqueous solutions for additional washing operations, for example a mixture of organic complexing ligand b) and the mixture of one or more fluorine-containing complexing ligands c).

Optionally following pulverization, the washed catalyst may be dried at temperatures of from 20 to 100° C. and at pressures of from 0.1 mbar to standard pressure (1013 mbar).

The present invention also provides for the use of the DMC catalysts according to the invention in a process for the preparation of polyether polyols by a polyaddition reaction between alkylene oxides and starter compounds having active hydrogen atoms.

Ethylene oxide, propylene oxide, butylene oxide as well as mixtures thereof are preferably utilized as the alkylene oxides. The construction of the polyether chains by alkoxylation may, for example, be carried out with only one monomeric epoxide or also in random or block manner with 2 or 3 different monomeric epoxides, for example with the so-called "ethylene oxide tip", in which a polyether having terminal polyethylene oxide blocks is created. More detail can be found in "Ullmanns Encyclopädie der industriellen Chemie", Vol. A21, 1992, p. 670 et seq.

Compounds having (number average) molecular weights of 18 to 2,000 and 1 to 8 hydroxyl groups are preferably utilized as the starter compounds having active hydrogen atoms. The following are named by way of example: ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, cane sugar, degraded starch or water.

Advantageously, such starter compounds having active hydrogen atoms may be utilized, as have been prepared, for example, by conventional alkaline catalysis from the low molecular weight starters previously named, and are oligomeric alkoxylation products having (number average) molecular weights of 200 to 2,000.

The polyaddition reaction between alkylene oxides and starter compounds having active hydrogen atoms, which is catalyzed by the catalysts according to the invention, takes place at temperatures of from 20 to 200° C., preferably within the range 40 to 180° C., more preferably at temperatures of from 50 to 150° C. The reaction can be carried out at total pressures of from 0.0001 to 20 bar. The polyaddition reaction may be carried out without solvents or in an inert organic solvent such as toluene and/or THF. The quantity of solvent is from 10 to 30 wt. %, in relation to the quantity of polyether polyol to be prepared.

The catalyst concentration is selected such that the polyaddition reaction can be well controlled under the given reaction conditions. The catalyst concentration is within the range 0.0005 wt. % to 1 wt. %, preferably within the range 0.001 wt. % to 0.1 wt. %, more preferably within the range 0.001 to 0.0025 wt. %, in relation to the quantity of polyether polyol to be prepared. The catalyst concentration may be in an amount ranging between any combination of these values, inclusive of the recited values.

The (number average) molecular weights of the polyether polyols prepared by the process according to the invention are within the range 500 to 100,000 g/mol, preferably within the range 1,000 to 50,000 g/mol, more preferably within the range 2,000 to 20,000 g/mol.

The polyaddition reaction may be carried out in continuous or discontinuous manner, for example in a batch or semi-batch process.

Owing to their markedly increased activity the catalysts according to the invention may be utilized at very low concentrations (25 ppm or less, in relation to the quantity of polyether polyol to be prepared). If the polyether polyols prepared in the presence of the catalysts according to the present invention are used for the production of polyurethanes (Kunststoffhandbuch, Vol. 7, Polyurethane, 3rd edition 1993, pp. 25–32 and 57–67), the removal of the catalyst from the polyether polyol may be omitted without impairing the product qualities of the polyurethane obtained.

The invention is further illustrated but is not intended to be limited by the following examples in which all parts and percentages are by weight unless otherwise specified.

EXAMPLES

Catalyst Preparation

Example 1

Preparation of a DMC Catalyst with Glycerol Triperfluorooctanoate (Catalyst A)

A solution of 41 g (300 mmol) zinc chloride in 41 ml distilled water was added, with vigorous stirring (24,000 rpm), to a solution of 4 g (12 mmol) potassium hexacyanocobaltate in 144 ml distilled water, 21 g tert.-butanol and 0.4 g glycerol triperfluorooctanoate, and the batch was stirred vigorously (24,000 rpm) for 10 min. The solid was isolated by filtration, stirred (10,000 rpm) for 10 min. with a mixture of 54 g tert.-butanol, 27 g distilled water and 1.6 g glycerol triperfluoro-octanoate, and re-filtered. Finally it was stirred again (10,000 rpm) for 10 minutes with a mixture of 78 g tert.-butanol and 0.7 g glycerol triperfluorooctanoate. Following filtration, the catalyst was dried under high vacuum at 60° C. for 2 hours.

Dried, pulverulent catalyst yield: 3.4 g

Example 2

Preparation of a DMC Catalyst with Ethylene Glycol mono-4,4,5,5,5-pentafluoropentyl Ether (Catalyst B)

The procedure of Example 1 was followed, but ethylene glycol mono-4,4,5,5,5-pentafluoropentyl ether was used in place of the glycerol triperfluorooctanoate of Example 1.

Dried, pulverulent catalyst yield: 2.5 g

Example 3

Preparation of a DMC Catalyst with Tetraethylene Glycol Pentafluoroethyl Ether (Catalyst C)

The procedure of Example 1 was followed, but tetraethylene glycol pentafluoro-ethyl ether was used in place of the glycerol triperfluorooctanoate of Example 1.

Dried, pulverulent catalyst yield: 2.6 g

Example 4

Preparation of a DMC catalyst with methacrylic acid-2,2,3,4,4,4-hexafluorobutyl Ester (Catalyst D)

The procedure of Example 1 was followed, but methacrylic acid-2,2,3,4,4,4-hexafluorobutyl ester was used in place of the glycerol triperfluorooctanoate of Example 1.

Dried, pulverulent catalyst yield: 1.2 g

Example 5

Preparation of a DMC catalyst with 2-fluoroethoxyethanol (Catalyst E)

The procedure of Example 1 was followed, but 2-fluoroethoxyethanol was used in place of the glycerol triperfluorooctanoate of Example 1.

Dried, pulverulent catalyst yield: 2.3 g

Example 6

Preparation of a DMC Catalyst with 2,2,3,3,4,4,5,5-octafluorohexane-1,6-diol (Catalyst F)

The procedure of Example 1 was followed, but 2,2,3,3,4,4,5,5-octafluorohexane-1,6-diol was used in place of the glycerol triperfluorooctanoate of Example 1.

Dried, pulverulent catalyst yield: 3.4 g

Example 7 (Comparison)

Preparation of a DMC Catalyst with Ethylene Glycol Monopentyl Ether (Catalyst G)

A solution of 41 g (300 mmol) zinc chloride in 41 ml distilled water was added, with vigorous stirring (24,000 rpm), to a solution of 4 g (12 mmol) potassium hexacyanocobaltate in 144 ml distilled water, 21 g tert.-butanol and 0.4 g ethylene glycol monopentyl ether, and the batch was stirred vigorously (24,000 rpm) for 10 min. The solid was isolated by filtration, stirred (10,000 rpm) for 10 min. with a mixture of 54 g tert.-butanol, 27 g distilled water and 1.6 g ethylene glycol monopentyl ether, and re-filtered. Finally it was stirred again (10,000 rpm) for 10 minutes with a mixture of 78 g tert.-butanol and 0.7 g ethylene glycol monopentyl ether. Following filtration, the catalyst was dried under high vacuum at 60° C. for 2 hours.

Dried, pulverulent catalyst yield: 1.7 g

Example 8 (Comparison)

Preparation of a DMC catalyst with hexane-1,6-diol (Catalyst H)

The procedure of Example 7 (Comparison) was followed, but hexane-1,6-diol was used in place of the ethylene glycol monopentyl ether of Example 7.

Dried, pulverulent catalyst yield: 2.6 g

Preparation of Polyether Polyols
General Method 50 g polypropylene glycol starter (molecular weight 1,000 g/mol) and 5 mg catalyst (25 ppm, in relation to the quantity of polyether polyol to be prepared) were introduced under protective gas (argon) into a 500-ml pressure reactor and heated, with stirring, to 105° C. Propylene oxide (approx. 5 g) was dispensed in all at once until the total pressure had risen to 2.5 bar. Further propylene oxide was dispensed in again only when an accelerated pressure drop was observed in the reactor. This accelerated pressure drop is indicative of catalyst activation. The remaining propylene oxide (145 g) was dispensed in continuously at a constant total pressure of 2.5 bar. Following complete dispensing of the propylene oxide and 2 hours of post-reaction time at 105° C., volatile constituents were distilled off at 90° C. (1 mbar), and the reaction mixture was cooled to room temperature.

The polyether polyols obtained were characterized by determination of the OH values, double bond contents and viscosities.

The course of the reaction was traced with time-activity curves (propylene oxide consumption [g] vs. reaction time [min]). The induction time was determined from the intersection point of the tangent at the steepest point of the time-activity curve with the extended base line of the curve. The propoxylation times which are decisive as regards catalyst activity correspond to the period of time between catalyst activation (end of the induction period) and the cessation of propylene oxide dispensing.

Example 9

Preparation of polyether polyol with Catalyst A (25 ppm)

| | | |
|---|---|---|
| Propoxylation time: | | 41 min |
| Polyether polyol: | OH value (mg KOH/g): | 29.7 |
| | Double bond content (mmole/kg): | 7 |
| | Viscosity 25° C. (mPas): | 915 |

Example 10

Preparation of polyether polyol with Catalyst B (25 ppm)

| | | |
|---|---|---|
| Propoxylation time: | | 17 min |
| Polyether polyol: | OH value (mg KOH/g): | 29.7 |
| | Double bond content (mmole/kg): | 7 |
| | Viscosity 25° C. (mPas): | 980 |

Example 11

Preparation of polyether polyol with Catalyst C (25 ppm)

| | | |
|---|---|---|
| Propoxylation time: | | 14 min |
| Polyether polyol: | OH value (mg KOH/g): | 30.1 |
| | Double bond content (mmole/kg): | 5 |
| | Viscosity 25° C. (mPas): | 834 |

Example 12

Preparation of polyether polyol with Catalyst D (25 ppm)

| | | |
|---|---|---|
| Propoxylation time: | | 30 min |
| Polyether polyol: | OH value (mg KOH/g): | 29.1 |
| | Double bond content (mmole/kg): | 7 |
| | Viscosity 25° C. (mPas): | 1000 |

Example 13

Preparation of polyether polyol with Catalyst E (25 ppm)

| | | |
|---|---|---|
| Propoxylation time: | | 27 min |
| Polyether polyol: | OH value (mg KOH/g): | 30.3 |
| | Double bond content (mmole/kg): | 7 |
| | Viscosity 25° C. (mPas): | 986 |

Example 14

Preparation of polyether polyol with Catalyst F (25 ppm)

| | | |
|---|---|---|
| Propoxylation time: | | 18 min |
| Polyether polyol: | OH value (mg KOH/g): | 29.5 |
| | Double bond content (mmole/kg): | 7 |
| | Viscosity 25° C. (mPas): | 855 |

Example 15 (Comparison)

| Preparation of polyether polyol with Catalyst G (25 ppm) | | |
|---|---|---|
| Propoxylation time: | | 20 min |
| Polyether polyol: | OH value (mg KOH/g): | 29.9 |
| | Double bond content (mmole/kg): | 9 |
| | Viscosity 25° C. (mPas): | 812 |

Example 16 (Comparison)

| Preparation of polyether polyol with Catalyst H (25 ppm) | | |
|---|---|---|
| Propoxylation time: | | 31 min |
| Polyether polyol: | OH value (mg KOH/g): | 30.0 |
| | Double bond content (mmole/kg): | 5 |
| | Viscosity 25° C. (mPas): | 1049 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A double metal cyanide (DMC) catalyst comprising
   at least one double metal cyanide compound;
   at least one organic complexing ligand lacking fluorine atoms; and
   at least one fluorine-containing complexing ligand.

2. The double metal cyanide (DMC) catalyst according to claim 1, further comprising water and/or at least one water-soluble metal salt.

3. The double metal cyanide (DMC) catalyst according to claim 1, wherein the double metal cyanide compound comprises zinc hexacyanocobaltate(III).

4. The double metal cyanide (DMC) catalyst according to claim 1, wherein the organic complexing ligand comprises tert-butanol.

5. The double metal cyanide (DMC) catalyst according to claim 1, wherein the catalyst comprises from about 1 to about 80 wt % of one or more fluorine-containing complexing ligands.

6. A process for the preparation of a DMC catalyst, comprising the steps of:
   forming a catalyst by reacting in aqueous solution
      at least one metal salt with at least one metal cyanid salt,
      at least one organic complexing ligand lacking fluorine atoms,
      and one or more fluorine-containing complexing ligands;
   isolating the catalyst;
   washing the catalyst; and
   optionally,
   drying the catalyst.

7. A double metal cyanide (DMC) catalyst comprising:
   at least one double metal cyanide compound;
   at least one organic complexing ligand lacking fluorine atom; and
   at least one fluorine-containing complexing ligand chosen from fluorinated alcohols, fluorinated ethers, fluorinated aldehydes, fluorinated ketones, fluorinated acetals, fluorinated carboxylic acid esters, fluorinated carboxylic acid amides, fluorinated carboxylic acid nitriles and fluorinated phosphorus compounds.

8. The double metal cyanide (DMC) catalyst according to claim 7, further comprising water and/or at least one water-soluble metal salt.

9. The double metal cyanide (DMC) catalyst according to claim 7, wherein the double metal cyanide compound is zinc hexacyanocobaltate(III).

10. The double metal cyanide (DMC) catalyst according to claim 7, wherein the organic complexing ligand is tert butanol.

11. The double metal cyanide (DMC) catalyst according to claim 7, wherein the catalyst comprises from about 1 to about 80 wt. % of one or more fluorine-containing complexing ligands.

12. A process for the preparation of a DMC catalyst, the process comprising:
   forming a catalyst by reacting in aqueous solution
      at least one metal salt with at least one metal cyanide salt,
      at least one organic complexing ligand lacking fluorine atoms, and
      at least one fluorine-containing complexing ligand chosen from fluorinated alcohols, fluorinated ethers, fluorinated aldehydes, fluorinated ketones, fluorinated acetals, fluorinated carboxylic acid esters, fluorinated carboxylic acid amides, fluorinated carboxylic acid nitriles and fluorinated phosphorus compounds;
   isolating the catalyst;
   washing the catalyst; and
   optionally,
   drying the catalyst.

* * * * *